United States Patent Office 3,510,688
Patented May 5, 1970

3,510,688
CIRCUIT ARRANGEMENT FOR AUTOMATIC
MEASURING OF PULSE AMPLITUDES
Leif Walter Andersson, Goteborg, Stig Roland Hollstrom, Molndal, and Lars Werner Sjostrom, Kollered, Sweden, assignors to Telefonaktiebolaget L M Ericsson, Stockholm, Sweden, a corporation of Sweden
Filed July 20, 1967, Ser. No. 654,923
Claims priority, application Sweden, Aug. 5, 1966, 10,669/66
Int. Cl. H03k 5/20, 4/08; G01r 19/16
U.S. Cl. 307—235     1 Claim

ABSTRACT OF THE DISCLOSURE

There is disclosed circuit arrangement for the automatic measuring of the amplitude of a periodic pulse signal. The signal is supplied to two electronic switches each having a capacitor connected to its output, a voltmeter being connected across the capacitors. The pulse signal is also supplied to a first pulse generator which controls one of the switches and via a phase inverter to a second pulse generator which controls the other switch. The pulse generators each comprise a saw-tooth signal generator which generates a ramp signal during the pulse or pulse interval respectively, a hold-circuit and a voltage divider from which a certain portion of the average peak value of the saw-tooth signal is obtained and a comparator which activates the appertaining switch when the amplitude values from the saw-tooth generator and the voltage divider coincide, i.e. when a portion of the pulse (or pulse interval) corresponding to said portion of the average peak value of the saw-tooth signal has elapsed.

---

The measuring pulse amplitudes has hitherto been carried out by using manual methods for example, by synchronizing an oscilloscope with the pulse to be measured suitable scales for time- and voltage axes are manually adjusted. After this the amplitude of the pulse is read out or registered automatically at a required point. It has furthermore been possible to measure the peak value of a pulse waveform by measuring its peak-to-peak value.

An object of the present invention is intended to provide a circuit arrangement for automatically measuring the pulse amplitude at a desired instant or moment of the pulse waveform.

Briefly, the invention contemplates a circuit arrangement for automatically measuring the amplitude of periodic pulse signals. The pulse signals are fed via two electronic switches to separate capacitors. The voltages on the capacitors are measured by an indicating device. Each of the switches is controlled to operate at particular times during the signal waveform. The time is determined by particular instantaneous amplitudes of saw-tooth voltage signals that are generated by the input pulse signals and the intervals between pulses.

Figure 1:
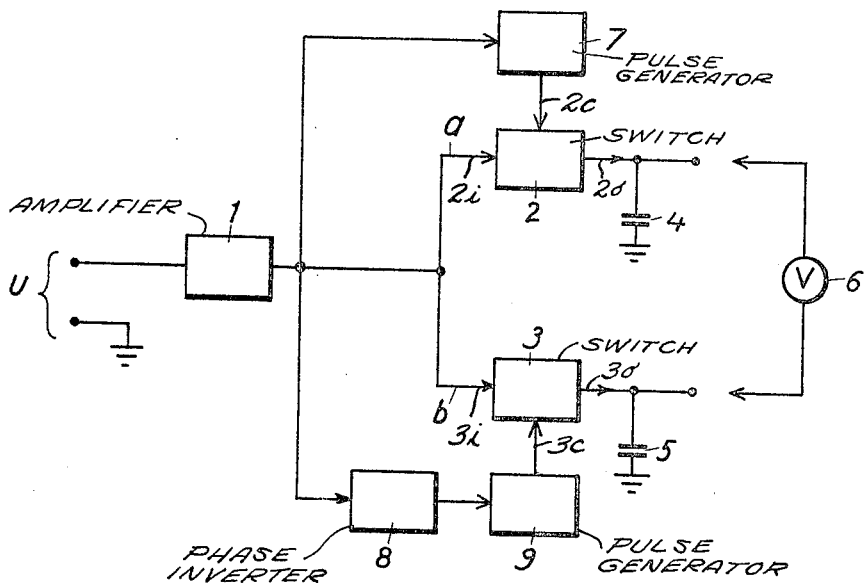
Figure 2:
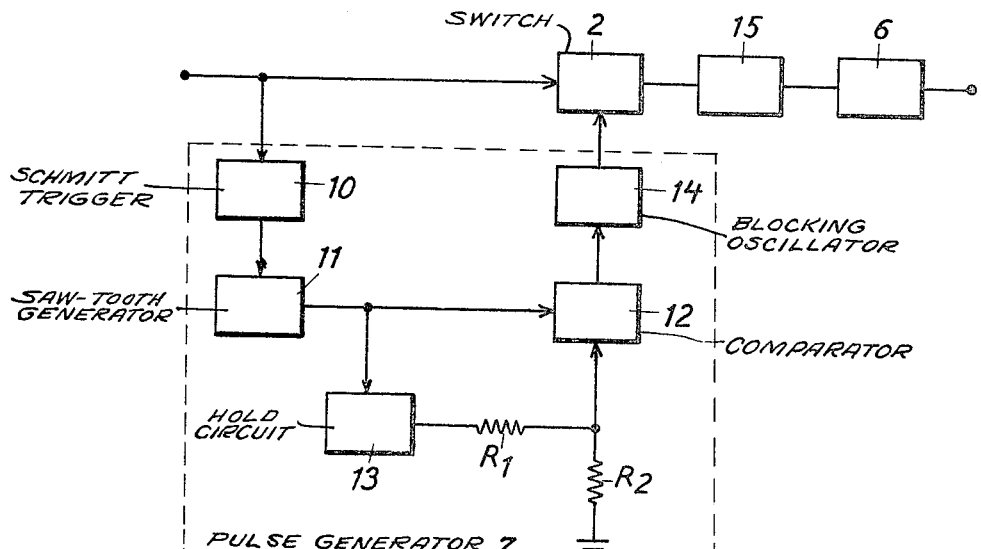
Figure 3:
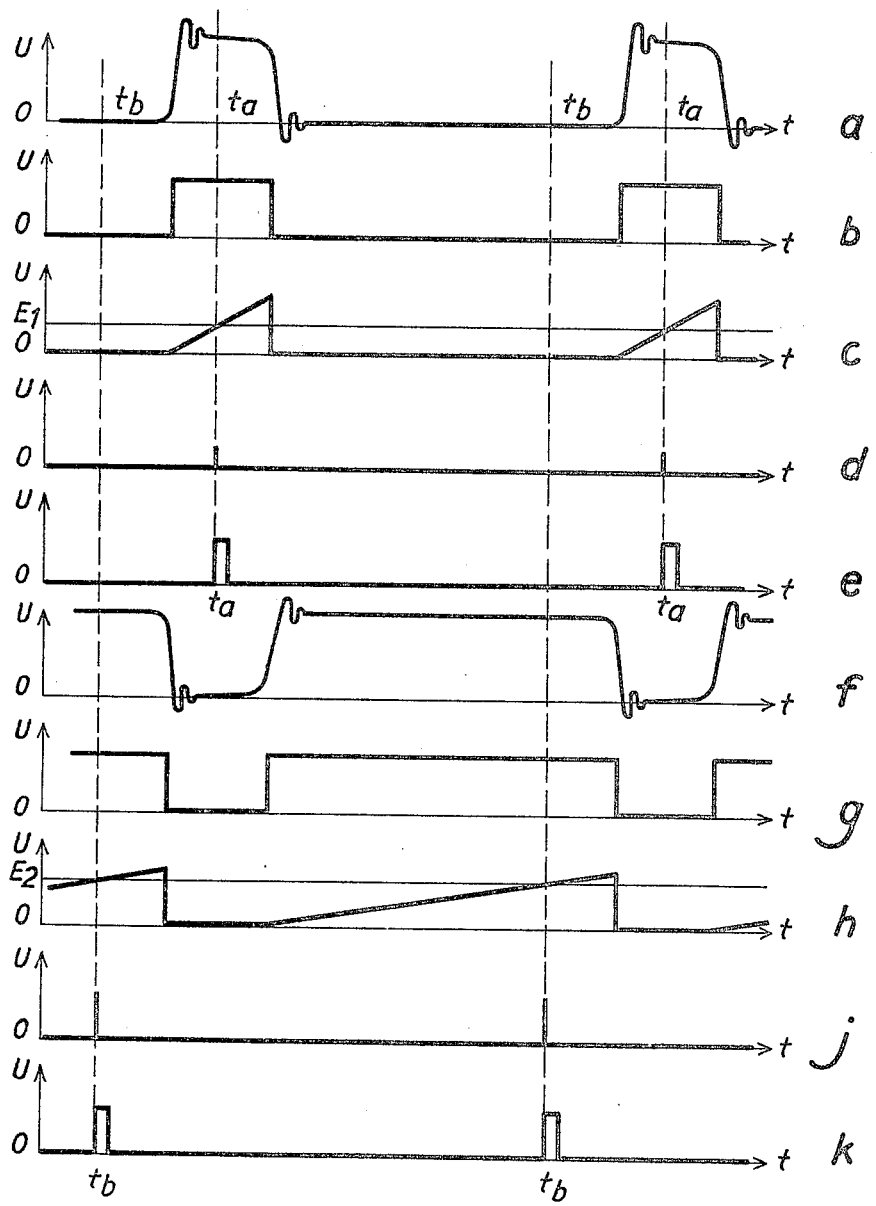
Figure 4:
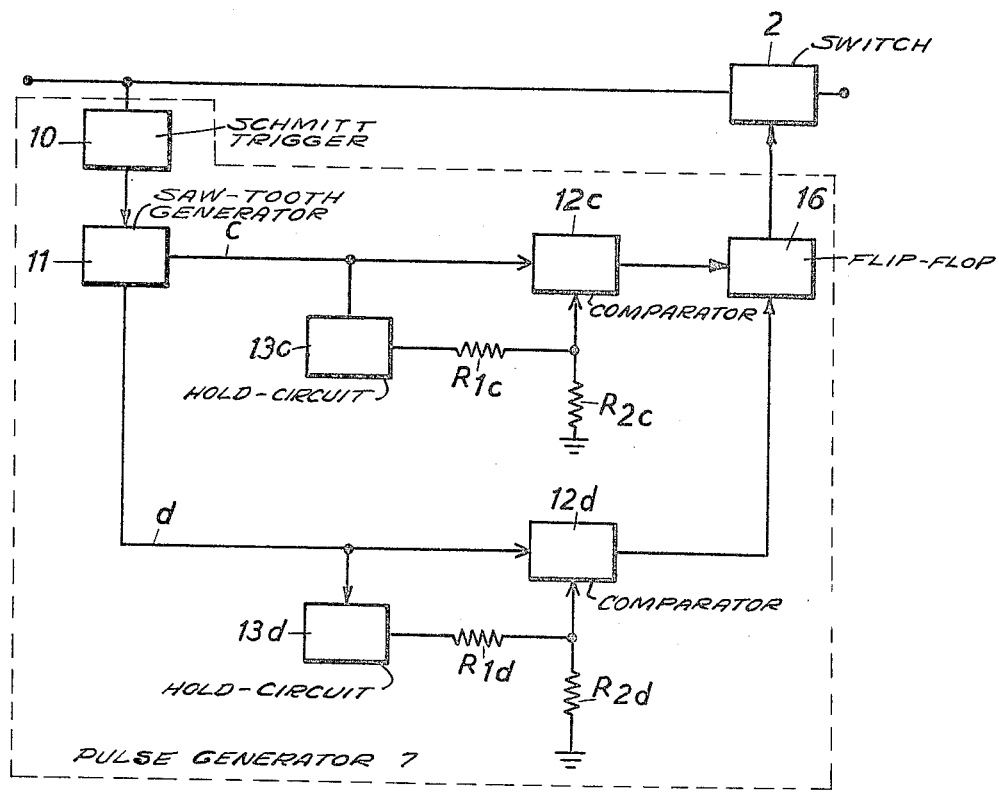

The invention will be more fully described with reference to the accompanying drawing, in which FIG. 1, shows a block diagram of the arrangement according to the invention. FIG. 2 shows, also in thhe form of a block diagram, a pulse generator which is part of the circuit arrangement of FIG. 1, FIG. 3a–3k are waveform diagrams explaining the principle of the invention and FIG. 4 shows another embodiment of the pulse generators of FIG. 1.

The theory of the invention can most easily be explained with reference to FIG. 3a. The pulse is to be measured a definite time interval after the leading edge of the pulse, which interval is a definite part of the complete pulse width. However, one must determine the pulse width in order to determine the desired measuring point in time. As shown in FIG. 3a a measuring should take place at a point of time $t_a$ and a point of time $t_b$. The point of time $t_a$ is chosen in such a way that the building-up process of the pulse has decreased sufficiently while the point of time $t_b$ is chosen in such a way that the pulse has not yet started, i.e. it occurs when the pulse waveform is at its zero-level. FIG. 1 shows a simplified block diagram of the arrangement according to the invention. By 1 is indicated an amplifier. From the output of the amplifier the signal is supplied through two parallel branches $a$ and $b$ to the signal inputs $2i$ and $3i$ of electronic switches 2 and 3, respectively, of the transistor type. Switch 2 is normally open and is only closed when it receives a signal on control input $2c$. At that time, signal input $2i$ is connected, via signal output $2o$, to capacitor 4. Similarly, switch 3 is only closed when it receives a signal on control input $3c$, and at that time, signal input $3i$ is connected, via signal output $3o$, to capacitor 5. Each capacitor is charged to a level corresponding to the levels of the signals received at the respective signal inputs $2i$ and $3i$ when the switches are closed. The switch 2 closes at time $t_a$ and switch 3 closes at time $t_b$, as will hereinafter become apparent. In any event, the difference between the two levels as stored by capacitors 4 and 5 can be read by voltmeter 6.

The output signal of the amplifier 1 is also supplied to a pulse generator 7 which feeds a signal of line $2c$ to close the switch 2 for a short time at the point of time $t_a$. The output signal of the amplifier 1 is furthermore supplied, via a phase inverter 8, to a pulse generator 9 mainly of the same construction as the pulse generator 7 feeds a signal on line $3c$ for a short time to close the switch 3 at a point of time $t_b$. The way in which the pulses at the points of time $t_a$ and $t_b$ respectively are obtained will be more closely explained in connection with FIG. 2 which shows an embodiment of the pulse generators 7 and 9. The pulse is supplied to a circuit 10 which can be a Schmitt trigger, which gives the pulse a normalized form with a well defined front edge and rear edge as shown in FIG. 3b. The output signal obtained from the output of the circuit 10 is supplied to a saw-tooth voltage generator or integrator 11 which transforms the obtained pulse to a saw-tooth formed pulse with a length corresponding to the width of the normalized pulse. This is shown in FIG. 3c. The pulse obtained from the output of the saw-tooth generator 11 is supplied to a comparator 12 where it is compared with a direct voltage $E_1$ chosen in such a way that it is equal to the value of the saw-tooth voltage at a determined point of time, according to the example when the saw-tooth voltage has reached half its peak value. This direct voltage is obtained by supplying the output signal of the saw-tooth generator 11 to a hold circuit 13 which can comprise a diode and capacitor connected in series to ground with the input connected to the diode and the output connected to the junction of the diode and capacitor. The circuit produces a direct voltage correpsonding to the top-value of the saw-tooth pulse. This voltage is supplied to a voltage dvider R1, R2 from which a desired portion of the voltage, according to the example, half the half value is supplied to the comparator 12. FIG. 3d shows the coincidence signal obtained from the comparator 12. This signal is supplied to a blocking-oscillator 14 which generates a pulse according to FIG. 3e. This pulse is supplied to control input $2c$ of the electronic switch 2.

As mentioned above, however, the zero level must be detected. This can be done by making a measurement at the point of time $t_b$. This point of time cannot be determined in relation to the pulses but is determined in relation to the pulse-interval (time between pulses). For this purpose pulses corresponding to the pulse intervals are generated via a phase inverter 8. The method described above for determination of the desired point of time within the pulse is used, with the difference that the point of time is much closer to the end of the saw-tooth pulse, for example when this pulse has reached 90% of its peak value. The conditions are obvious from FIGS. 3f–3k. The pulse generator 9 causing this corresponds to the pulse generator 7 but the voltage divider is adjusted in a different way, for example in the proportion 9/10 and as is obvious from FIG. 3h a pulse is fed to the switch 3 when 9/10 of the pulse interval has elapsed.

In this way the capacitors 4 and 5 will be constantly charged in correspondence to the signal level at the point of time $t_a$ and the signal level at the point of time $t_b$ respectively so that the voltmeter will indicate the amplitude of the pulse.

I might be of importance that the width of the opening pulse of the switch can be varied in correspondence to the width of the pulse to be measured in order to decrease the charging time of the capacitor at low frequencies. An arrangement by means of which this is accomplished is shown in FIG. 4 in the form of a block diagram where identical parts have the same reference as in FIG. 2. The pulse is supplied through the circuit 10 and the saw-tooth generator 11 to two parallel branches c and d each comprising a comparator 12, a hold circuit 13 and a voltage divided R1, R2 in correspondence with FIG. 2. The voltage dividers of the two parallel branches are adjusted in different ways e.g. so that the first comparator produces a coincidence signal when the saw-tooth pulse has reached 40% of its half value, while the other comparator produces a coincidence signal when the saw-tooth pulse has reached for example 70% of its peak value. The output signals of the two comparators 12 are supplied to two inputs of a flip-flop 16 which is triggered on by the first comparators and triggered on by the second comparator. The output signal of the flip-flop is fed to the electronic switch 2 which in this way is kept closed during a time proportional to the pulse width.

We claim:
1. A circuit arrangement for measuring the amplitude of periodic pulse signals comprising:
 a signal input means adapted to receive the signal to be measured;
 first and second electronic switches, each of said switches having a signal input, a signal output, and a control input;
 first and second capacitors;
 means for connecting each of the signal inputs of said electronic switches to said signal input means;
 means for connecting the signal output of said first switch to said first capacitor;
 means for connecting the signal output of said second switch to said second capacitor;
 a signal measuring means connected across said capacitors;
 a phase inverter;
 first and second pulse generators, each of said pulse generators comprising an input terminal, an output terminal, a saw-tooth voltage generator, said saw-tooth voltage generator having an input and an output;
 means for connecting the input of said saw-tooth generator to said input terminal;
 a hold circuit; said hold circuit having an input and an output;
 means for connecting the output of said saw-tooth voltage generator to the input of said hold circuit;
 a voltage divider, said voltage divider having an input and a tap;
 means for connecting the output of said hold circuit to the input of said voltage divider;
 a signal comparing circuit, said signal comparing circuit having first and second inputs and an output;
 means for connecting the first input of said signal comparing circuit to the output of said saw-tooth voltage generator;
 means for connecting the second input of said signal comparing circuit to the tap of said voltage divider;
 means for connecting the output of said signal comparing circuit to said output terminal;
 means for connecting the input terminal of said first pulse generator to said input means;
 signal phase inverting means connecting said signal input means to the input terminal of said second pulse generator;
 means for connecting the control input of said first switch to the output terminal of said first pulse generator; and
 means for connecting the control input of said first switch to the output terminal of said second pulse generator.

References Cited

UNITED STATES PATENTS

| | | | |
|---|---|---|---|
| 3,281,665 | 10/1966 | Foster et al. | 307—235 |
| 3,295,060 | 12/1966 | Stern | 307—235 X |
| 3,395,354 | 7/1968 | Maupin | 307—228 X |
| 3,421,020 | 1/1969 | Ringelhaan | 307—228 X |

JOHN S. HEYMAN, Primary Examiner

U.S. Cl. X.R.

307—228, 243, 246; 324—103